Oct. 20, 1970     K. L. KROLSKI     3,535,491

WORK TIME METER FOR ELECTRIC WELDER

Filed Feb. 21, 1968

INVENTOR.
Kenneth L. Krolski
BY Thomas E Torphy
Attorney

United States Patent Office 3,535,491
Patented Oct. 20, 1970

3,535,491
WORK TIME METER FOR ELECTRIC WELDER
Kenneth L. Krolski, Milwaukee, Wis., assignor to McGraw-Edison Company, Milwaukee, Wis., a corporation of Delaware
Filed Feb. 21, 1968, Ser. No. 707,226
Int. Cl. B23k 9/10
U.S. Cl. 219—131  12 Claims

ABSTRACT OF THE DISCLOSURE

A work time meter for an electric welder including an electric clock and solid state switching means in series with the electrical power input to the clock. The meter system includes means for sensing the voltage between the welding electrodes of the electric welder and electronic voltage level detection means for controlling the operation of the switching means to turn on the electric clock when the voltage appearing across the electrodes of the electric welder is between preset upper and lower limits which define the normal operating voltage range of the welder.

BACKGROUND OF THE INVENTION

This invention relates to arc welder electrode voltage sensing devices with timing means for determining when the sense voltage lies between set limits and, more particularly, to work time meters for electric welders.

In the practice of commercial welding, it is common to apply incentive pay methods to welding jobs. It has been a common practice to pay welders according to the number of welding rods consumed. It is obvious that the correlation between weld material deposited and the number of missing weldings rods may be subject to inaccuracies. Another method of determining weld metal deposited is to weigh the work piece before welding and again after welding, the difference representing the weight of weld metal deposited. With large work pieces the latter method may be impractical.

SUMMARY OF THE INVENTION

It is an object of the invention to provide a low cost, accurate and dependable welding work time meter for measuring the time that an electric welder is operating efficiently with electrode voltages representative of the normal voltages existing during normal welding operation.

It is another object of the invention to provide a work time meter as heretofore described which includes solid state electronic circuitry for higher reliability and accuracy.

It is still another object of the invention to provide a work time meter as heretofore described with circuitry adaptable for remote monitoring of the welding operation with a minimum of added wiring installation cost.

Other objects and advantages of the invention will become apparent upon reading the following description.

These objects are accomplished by providing electrically powered clock means, solid state switching means for opening and closing the electric power circuit to said clock means, and circuit means for sensing the voltage across the electrodes of an electric welder and operating the solid state switching means to close the power circuit to the clock when the sense voltage is between upper and lower limits which define a voltage range within which the voltages existing across the electrodes normally lie during actual welding operations. The device further includes electric lamp means for visually indicating when the welder is operating in correct voltage range. The electric power circuit for the clock is furnished with a relatively low operating voltage so that the clock or other indicating or monitoring equipment may be placed remotely from the welder with an intermediate wiring circuit of minimum cost and complexity.

DESCRIPTION OF THE PREFERRED EMBODIMENT

Figure 1:
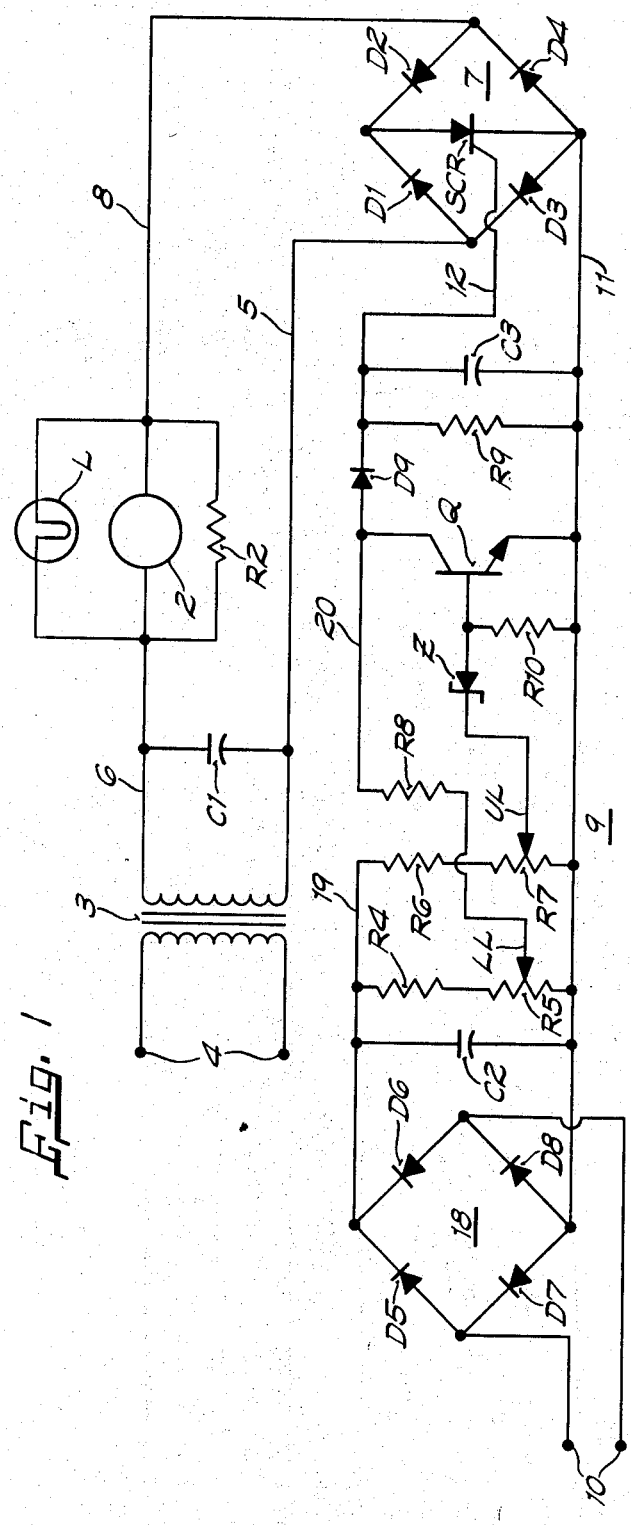
FIG. 1 is a schematic diagram of a work time meter embodying the present invention.

Referring to FIG. 1, an electrically powered clock 2 is shown to be energized through a circuit comprising a step-down transformer 3 and a silicon controlled rectifier SCR. The primary terminals 4 of transformer 3 are connected to a 110 volt alternating current power source. The 24 volt secondary of transformer 3 is connected to conductors 5 and 6. A surge suppressing capacitor C1 is connected across conductors 5 and 6 to protect silicon controlled rectifier SCR and the associated rectifying diodes D1, D2, D3 and D4 which comprise a full wave rectifying bridge 7. Conductor 6 leads to one of the power input terminals of clock 2. A conductor 8 leads from the other power terminal of clock 2 to one of the alternating current terminals of bridge 7. An incandescent lamp L is connected across the terminals of clock 2. The lamp L lights when power is applied to clock 2 to indicate when clock 2 is running. Conductor 5 connects to the other alternating current terminal of bridge 7. Silicon controlled rectifier SCR is connected across the DC terminals of bridge 7 and, when conductive, completes the power circuit to clock 2. A resistor R2 is connected across the terminals of clock 2 to insure sufficient holding current for silicon controlled rectifier SCR.

A level detection and firing circuit 9 has its input terminals 10 connected across the welding electrodes of an AC or DC electric welder (not shown). The output terminals of circuit 9 comprise a conductor 11 connected to the cathode of silicon controlled rectifier SCR and a conductor 12 connected to the gate of silicon controlled rectifier SCR.

The terminals 10 are connected to the input terminals of a rectifying bridge 18 comprising rectifying diodes D5, D6, D7 and D8. The negative output terminal of bridge 18 is connected to conductor 11. The positive output terminal of bridge 18 is connected to a conductor 19. It can be seen that bridge 18 provides a positive output to conductor 19 and a negative output to conductor 11 regardless of the polarity of the voltages applied to terminals 10 or whether the voltage applied to terminals 10 is AC.

A capacitor C2 is connected between conductors 19 and 11 to filter the output of bridge 18. A first voltage divider circuit is connected between conductor 19 and conductor 11 and comprises a fixed resistor R4 in series with an adjustable potentiometer resistor R5 having a lower limit determining slider LL. A second voltage divider circuit is connected between conductors 19 and 11 and comprises a fixed resistor R6 in series with an adjustable potentiometer resistor R7 having an upper limit determining slider UL.

The setting on slider LL determines the lower limit of voltage across terminals 10 at which silicon controlled rectifier SCR will fire. A current limiting resistor R8 is connected between slider LL and a conductor 20. A unilaterally conducting diode D9 is connected between conductor 20 and conductor 12. When the voltage appearing at slider LL is sufficient to overcome the diode drop of diode D9 and the drop between the gate and cathode of silicon controlled rectifier SCR and this voltage on slider LL is sufficient to cause enough current flow through resistor R8 to the gate of silicon controlled rectifier SCR, silicon controlled rectifier SCR is turned on and clock 2 begins to run.

A resistor R9 and a capacitor C3 are each connected across conductors 11 and 12 for filtering purposes and eliminates erratic firing of the SCR.

As the voltage across terminals 10 continues to rise the voltage at slider UL eventually reaches a sufficient value to overcome the breakdown voltage of a Zener diode Z and the base to emitter drop of a transistor Q. Transistor Q thereupon is rendered conductive and saturates to effectively connect conductor 20 to conductor 11. A resistor R10 is a conventional leakage resistor.

When transistor Q saturates, the voltage drop thereacross is sufficiently less than the voltage drop across diode D9 and the gate to cathode circuit of silicon controlled rectifier SCR to insure that no gating current will flow. Silicon controlled rectifier SCR thereupon will turn off when the anode to cathode voltage thereacross reaches a sufficiently low value which will occur within the half cycle time of the AC voltage powering clock 2. Clock 2 will therefore stop running when the voltage across terminals 10 exceeds the desired upper limit as set by slider UL. When the electrode voltage becomes less than the upper limit, transistor Q turns off and gating current again flows through diode D9 to cause clock 2 to run. When the electrode voltage decreases below the lower limit, gating current ceases to flow and the clock stops.

It will be noted that the resistor R8 by limiting the current flow to conductor 20 will tend to isolate the upper and lower voltage limit settings.

Other forms of breakdown devices could be substituted for both diode D9 and Zener diode Z.

Figure 2:
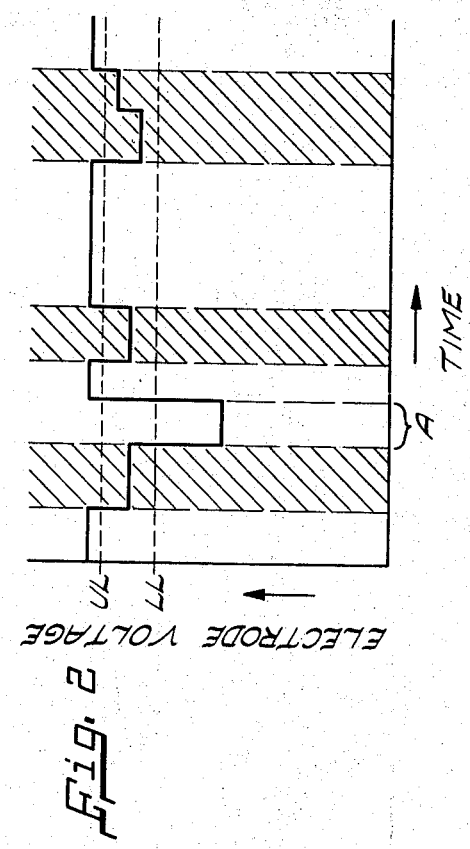
FIG. 2 is a graphical illustration showing the operation of the device illustrated in FIG. 1.

The operation of the system is illustrated by FIG. 2 in which the shaded portions represent the periods of time during which clock 2 is running, the dashed horizontal line UL represents the upper limit as set on slider UL, and the dashed horizontal line LL represents the lower voltage limit as determined by the setting of slider LL. The voltage is illustrated as initially being above the upper level. This would occur when no arc is being drawn and the welding electrode is held remotely from the work piece. When a proper welding arc is being drawn, the voltage drops to a level between the upper and lower limits and will remain in this range as long as the normal welding operation continues. During this time clock 2 will run to record the elapsed welding time. The electrode voltage may fluctuate between the upper and lower limits without turning clock 2 off. As shown during the period of time labelled A, the electrode voltage may drop below the lower limit to turn clock 2 off. This may occur when the arc is too short for proper welding or when the welding electrode becomes grounded.

The highly adaptable and simplified solid state circuitry of this device permits miniaturization of this work time meter and permits it to be used with DC welding voltages of either polarity or with alternating current.

The low voltage of the clock powering portion of the circuit facilitates remote installation of the monitoring equipment since the relatively low voltage will permit conductors 5 and 8, for instance, to be installed as lower cost wiring.

Although the disclosed embodiment is particularly adapted to accomplish the stated objects, it is not intended that the appended claims be limited to the disclosed embodiment since it is adaptable to modification without departing from the scope of the claims.

I claim:
1. In a work time meter for an electric welder:
electrically powered clock means for recording the time that said clock means is energized;
gated solid state switching means for opening or closing the electric power circuit for said clock means;
circuit control means for sensing the electrode voltage across the electrodes of an electric welder and gating said switching means to close said power circuit when said electrode voltage is between upper and lower limits which define a voltage range within which the voltages existing across said electrodes normally lie during actual welding operations;
first level detection means within said circuit control means for providing a gating current to said switching means when said electrode voltage exceeds a preset lower limit; and
second level detection means within said circuit control means including semiconductor means for shunting said gating current from said switching means when said electrode voltage exceeds a preset upper limit.

2. The invention as defined in claim 1 together with selectively adjustable means for adjusting said upper limit.

3. The invention as defined in claim 1 together with selectively adjustable means for adjusting said lower limit.

4. The invention as defined in claim 1 together with selectively adjustable means for adjusting said upper and lower limits.

5. The invention as defined in claim 1 in which said semiconductor means is a transistor which is normally nonconductive.

6. The invention as defined in claim 1 in which said circuit means comprises solid state upper and lower voltage level detection circuits.

7. The invention as defined in claim 6 in which at least one of said level detection circuits comprises a resistor in series with a diode.

8. The invention as defined in claim 6 in which at least one of said level detection circuits comprises a breakdown device.

9. The invention as defined in claim 8 in which said breakdown device is a Zener diode.

10. The invention as defined in claim 1 in which said electric power circuit for said clock means is operated at a voltage reduced sufficiently from common power line voltages to permit simplified low cost wiring between said welder and said clock means at a location remote from said welder.

11. The invention as defined in claim 1 together with visual indicating means for giving visual indication as to when said clock means is running.

12. The invention as defined in claim 1 in which said gated solid state switching means is a silicon controlled rectifier.

References Cited

UNITED STATES PATENTS

| | | | |
|---|---|---|---|
| 2,340,114 | 1/1944 | Duis | 219—135 X |
| 2,366,548 | 1/1945 | Oestreicher et al. | 219—135 X |
| 3,099,782 | 7/1963 | Smith | 307—237 X |

RALPH F. STAUBLY, Primary Examiner

J. G. SMITH, Assistant Examiner

U.S. Cl. X.R.

219—109